2,892,762

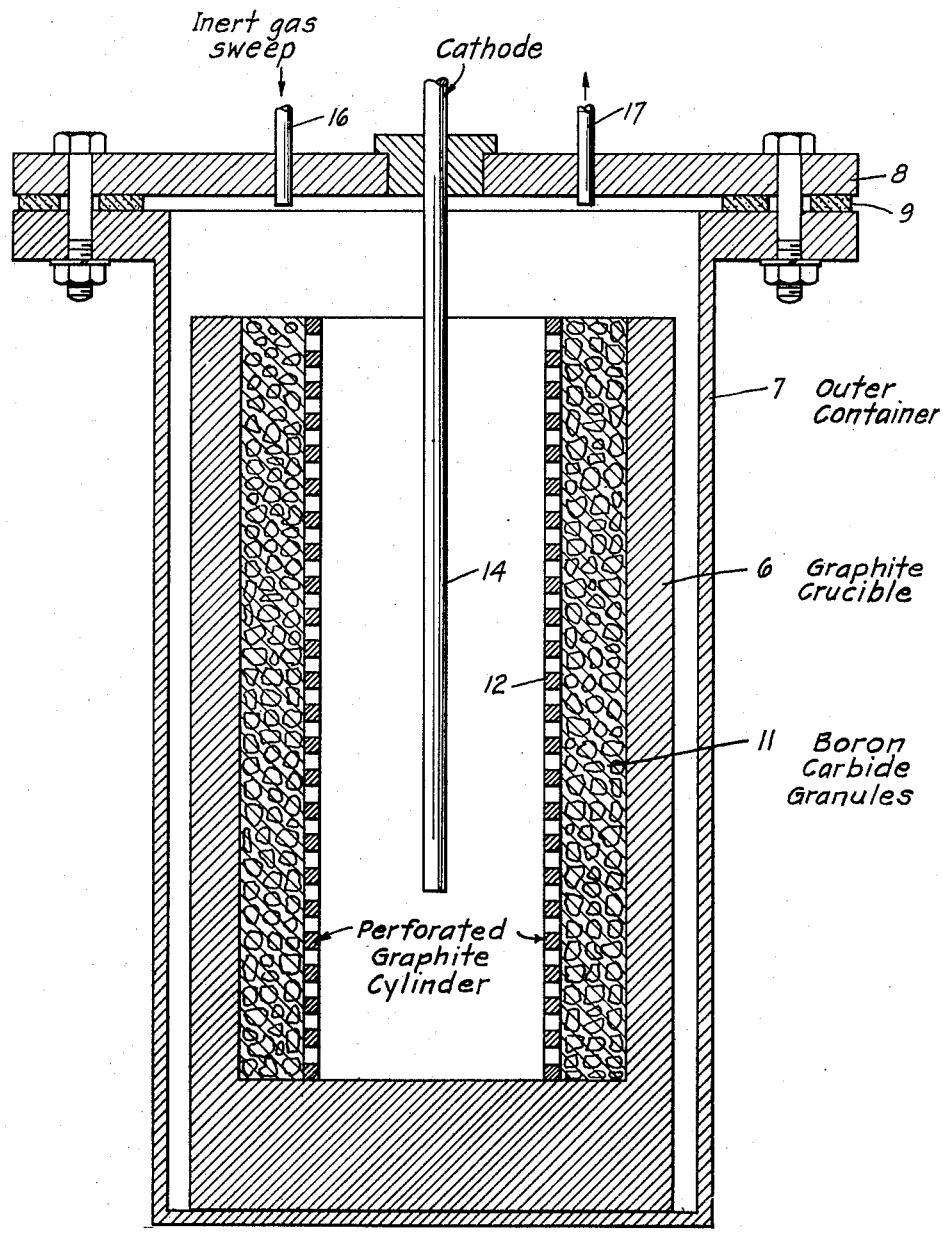

PRODUCTION OF ELEMENTAL BORON ELECTROLYTICALLY

David R. Stern, Fullerton, and Quentin H. McKenna, Los Angeles, Calif., assignors to American Potash & Chemical Corporation, a corporation of Delaware Application April 1, 1957, Serial No. 649,730

7 Claims. (Cl. 204—60)

This invention relates to an electrolytic method of producing elemental boron.

An object of this invention is a process for producing substantially pure elemental boron on a commercial scale. Another object is to produce substantially pure elemental boron in a form in which it is amenable to direct application in the arts of metallurgy, chemistry, and other industrial applications.

The commercial importance of the element boron is well known and need not be described in this disclosure.

Boron has been prepared by the reduction of boron oxide with reducing metals such as magnesium. However, this method is a batch process and yields boron containing considerable oxide and reducing metal impurities and further extensive purification must be effected to gain a boron purity in excess of 92.0 percent. Nevertheless, most commercial elemental boron is made by this process.

Boron halides have been reduced in the presence of hydrogen on either hot filaments or by passing the boron halides and hydrogen through a high tension electric arc. These methods have been reported to give quite pure boron, but are batch operations and give low yields per individual pass of the boron halides and hydrogen through the reaction zone. In addition, the temperatures at the reaction site are relatively high (in excess of 1200° C.) and cause the boron produced to be particularly susceptible to contamination from various sources. The reduction of boron halides with alkali metals has also been described.

Electrolytic methods have been described in which boric oxide dissolved in molten baths is electrolytically reduced in some manner such that elemental boron is deposited on the cathode. The electrolytic reduction of boric oxide yields boron which contains considerable oxide contamination as well as metallic impurities. The electrolysis of a double fluoride salt of boron such as $KBF_4$, dissolved in potassium chloride, can produce a substantially pure elemental boron, but is essentially a batch process requiring high temperatures for electrolysis. Potassium fluoride also forms as a by-product, and, as the fluoride concentration increases, the current efficiency decreases. Periodic removal of potassium fluoride therefore becomes necessary if prolonged electrolysis of the system $KCl-KBF_4$ is to be accomplished. In addition, chlorine gas is produced at the anode and presents additional problems in handling of this corrosive gas at elevated temperatures.

In general, this invention involves the preparation of elemental boron from boron carbide in a fused salt electrolytic system. We have found that if boron carbide is made an anode and submerged in a fused salt bath containing an alkali chloride or a mixture of alkali chlorides and potassium fluoborate, boron contained in the boron carbide structure passes into the solution leaving a skeletal carbon residue. The dissolved boron under the influence of a direct current is transported to the cathode where it is deposited as elemental boron. In essence, boron is made from boron carbide employed as a consumable anode by what we consider to be an anodic transfer with no appreciable electrolysis of the fluoborate or the alkali chlorides.

The process is best performed at a potential which is too low (i.e., less than 3 volts) to reduce electrolytically the potassium fluoborate contained in the bath, and to discharge chlorine gas at the anode. Since very low potentials are required in this process (considerably less than conventional electrolytic processes) a low energy requirement per unit weight of boron is realized. Moreover, since lower temperatures of operation are possible, higher current efficiencies as well as greater ease of operation are realized. The temperature of operation can be in the range of about 375° to 1000° C.

It was found that the presence of the double fluoride salt of boron is essential and is apparently involved in the anodic dissolution of boron in the boron carbide anode. We now believe that the $BF_4^-$ ion enters into an oxidation-reduction reaction with boron carbide ($B_4C$) producing a new ionic species which is subsequently reduced at the cathode to elemental boron. The $BF_4^-$ is regenerated by being reoxidized, probably at the anode, and is again available for the reaction with boron carbide. Since the concentration of fluoborate in the bath is essentially not reduced under the electrolysis conditions described here, it appears that it acts as a "carrier" of the boron supplied by the boron carbide anode, but we do not wish to be limited by this theory of operation.

An electrolytic cell for use in practicing this invention is shown in Figure 1. This includes a graphite or carbon crucible 6 placed inside a heat resistant metal shell 7 made of Inconel or other suitable metal. The outer Inconel pot is fitted with an Inconel lid 8 and an asbestos gasket 9 so that the melt can be kept under an inert atmosphere during electrolysis. The cell can be externally heated or internally heated by electrical resistance heating in the bath itself. The graphite crucible is made anodic by connecting the metal shell to the positive terminal of the direct current source. The boron carbide is made anodic by packing it, as at 11, in granular form between the inner crucible 6 and a perforated carbon cylinder 12 which acts as a mechanical support for the boron carbide granules. Although boron carbide granules are used by way of illustration, we do not wish to be limited thereto since massive boron carbide rods may also be used. It is obvious to those skilled in the art, that this container can be designed such that the residual carbon remaining after electrolysis can be removed and a new boron carbide inserted. The cathode, which can be an iron or a mild steel bar 14, is suspended vertically through the lid into the bath inside the carbon barrier.

The following example is illustrative practice of the investigation. A mixture of reagent grade NaCl and KCl consisting of 61 weight percent KCl and 39 weight percent NaCl was charged into a graphite crucible which had been packed with a commercial grade of boron carbide granules between the crucible wall and the perforated graphite retaining cylinder. The charge crucible was placed in an Inconel pot, the lid fastened in place, and the entire assembly set in a furnace and heated to about 800° C. to melt the alkali chlorides under an inert gas (argon) sweep. Next potassium fluorborate ($KBF_4$) was added in an amount that gave a final 20 weight percent concentration of KBF₄. Other double fluoride salts may also be employed such as NaBF₄ and LiBF₄. The bath temperature was then adjusted to the desired operating temperature which in this case can range between about 500° and 1000° C. However, we prefer to operate at about 750° C. A mild steel rod-shaped cathode was introduced to the melt through a port provided in the shell lid and the electrolysis performed under argon gas sweep.

The voltage was held between 2 and 3 volts and as boron deposited on the cathode, no evolution of chlorine occurred at the boron carbide and graphite anode surface. During the run, the current flow remained constant and tended to increase slightly with time. No increase in voltage was noted with time, as the cathode deposit increased, which is not true of other electrolytic boron processes.

At the completion of the run the current was turned off and the cathode raised out of the bath but kept within the cell to cool in an argon atmosphere. Although in these experiments argon was used as an inert gas sweep, we have found that the deposits may be removed relatively hot into the air for the electrolyte which coats the boron deposit acts as a protective coating and prevents undue oxidation. After cooling, the boron deposit, coated with occluded salt, was readily broken away from the cathode and washed thoroughly with water, then with concentrated hydrochloric acid. Finally it was rinsed with water and then acetone and dried in a vacuum oven at 35–45° C.

The product is in the form of small crystalline particles held together as spongy appearing aggregates. The following representative analyses gives evidence of the purity of the product that boron can be obtained from a commercial grade of boron carbide.

|  | Percent |
|---|---|
| Boron | 96.3 |
| HNO₃ Insol. | [1]0.1 |
| Sodium | 0.62 |
| Iron | 0.06 |
| Undetermined | 2.9 |

[1] Boron carbide and free carbon.

Another advantage of this invention over other electrolytic processes is that a rather fine particle size of boron can be obtained by control of the electrolytic conditions.

In several series of experiments presented by way of illustration, and we do not wish to be limited thereto, the particle size varied from 1–10 microns, depending on electrolytic conditions.

Thus, this process can give a boron with particle sizes in the micron range without additional grinding.

Upon completion of run and removal of the cathode, another cathode can be immediately introduced and a second run performed. These cycles can be repeated until the available boron in the boron carbide source has been reduced to about 20 percent of its original content, which is manifested in a reduction of the current flow at comparable voltages. The residue can then be removed and fresh B₄C granules added. In large scale operations the residue would be used to prepare more B₄C feed material. Analytical results and material balance data indicated that essentially no boron was obtained directly from the fluoborate carrier. The following data is illustrative of this fact.

| | |
|---|---|
| Total boron introduced as KBF₄ grams | 10.3 |
| Total boron produced and recovered do | 15.1 |
| Percent boron in electrolyte residue percent | 0.87 |
| Total boron in electrolye residue grams | 6.9 |
| Boron lost as cathode drag-out in deposit do | 2.1 |
| Boron unaccounted for. The amount of boron lost as volatile BF₃ was not measured grams | 1.3 |

If other electrolyte mixtures are used such as potassium chloride and lithium chloride the temperature of operation can be lowered to about 375° C. to 650° C. However, we find that the best temperature of operation lies in the range of 750° to 850° C. The fluoborate should be not less than 3% by weight of the mixture and not more than about 50%: as one approaches a 100% fluoborate composition, the temperature of operation is limited to about 500° C. since pure KBF₄ readily decomposes thermally above this temperature. In addition, a satisfactory electrolysis cannot be performed in a 100% fluoborate bath due to the extreme difficulty in reaching a sufficiently high cathode current density to overcome the bath reaction between boron depositing on the cathode and the BF₄⁻ ions in the melt.

The alkali chloride reduces the BF₄⁻ ion concentration so that satisfactory cathode current densities can be obtained where the rate of deposition of boron is much greater than the rate of resolution of the deposited boron. Also, the presence of the chloride lowers the temperature of operation. As a chloride providing material one can use KCl, NaCl, LiCl, CaCl₂ and mixtures of these. One can also use lithium or sodium fluoborate.

We claim:

1. A process for production of boron comprising passing a current between a boron carbide anode and a cathode under a potential of less than about 3 volts through a fused salt bath at a temperature between about 375° C. and about 1000° C. to deposit boron on the cathode, the bath consisting essentially of an alkali metal chloride and an alkali metal fluoborate, the fluoborate providing from about 3% to about 50% of the mixture.

2. A process for production of boron comprising passing a current between a massive boron carbide anode connected directly to a source of direct current and a cathode under a potential of less than about 3 volts through a fused salt bath at a temperature between about 375° C. and about 1000° C. to deposit boron on the cathode, the bath consisting essentially of an alkali metal chloride and an alkali metal fluoborate, the fluoborate providing from about 3% to about 50% of the mixture.

3. A process for production of boron comprising passing a current between a boron carbide anode and a cathode under a potential of less than about 3 volts through a fused salt bath at a temperature between about 375° C. and about 1000° C. to deposit boron on the cathode, the bath consisting essentially of an alkali metal chloride and an alkali metal fluoborate, the fluoborate providing from about 3% to about 50% of the mixture, the anode comprising powdered boron carbide.

4. A process for production of boron comprising passing a current between a boron carbide anode and a cathode under a potential of less than about 3 volts through a fused salt bath at a temperature between about 375° C. and about 1000° C. to deposit boron on the cathode, the bath consisting essentially of an alkali chloride and potassium fluoborate, the fluoborate providing from about 3% to about 50% of the mixture.

5. A process for production of boron comprising passing a current between a boron carbide anode and a cathode under a potential of less than about 3 volts through a fused salt bath at a temperature between about 375° C. and about 1000° C. to deposit boron on the cathode, the bath consisting essentially of a mixture of alkali chlorides and potassium fluoborate, the fluoborate providing from about 3% to about 50% of the mixture.

6. A process for production of boron comprising passing a current between a boron carbide anode and a cathode under a potential of less than about 3 volts through a fused salt bath at a temperature between about 375° C. and about 1000° C. to deposit boron on the cathode, the bath consisting essentially of an alkali chloride and sodium fluoborate, the fluoborate providing from about 3% to about 50% of the mixture.

7. A process for production of boron comprising passing a current between a boron carbide anode and a cathode under a potential of less than about 3 volts through a fused salt bath at a temperature between about 375° C. and about 1000° C. to deposit boron on the cathode, the bath consisting essentially of an alkali chloride and lithium fluoborate, the fluoborate providing from about 3% to about 50% of the mixture.

References Cited in the file of this patent

UNITED STATES PATENTS

| | | |
|---|---|---|
| 2,572,248 | Cooper | Oct. 23, 1951 |
| 2,832,730 | Nies et al. | Apr. 29, 1958 |
| 2,848,396 | Murphy et al. | Aug. 19, 1958 |

FOREIGN PATENTS

| | | |
|---|---|---|
| 164,170 | Australia | Apr. 8, 1955 |